(12) United States Patent
O'Rear et al.

(10) Patent No.: US 6,822,006 B1
(45) Date of Patent: Nov. 23, 2004

(54) METHODS OF CONTROLLING THE TEMPERATURE OF AN EXOTHERMIC REACTION

(75) Inventors: Dennis J. O'Rear, Petaluma, CA (US); Charles L. Kibby, Benicia, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 10/613,594

(22) Filed: Jul. 2, 2003

(51) Int. Cl.[7] .............................................. C07C 27/00
(52) U.S. Cl. .................... 518/712; 518/700; 518/705
(58) Field of Search ............................... 518/700, 705, 518/712

(56) References Cited

U.S. PATENT DOCUMENTS

| | | |
|---|---|---|
| 2,438,029 A | 3/1948 | Arwell |
| 4,433,065 A | 2/1984 | van der Burgt et al. |
| 5,252,613 A | 10/1993 | Chang et al. |
| 6,160,026 A | 12/2000 | Dai et al. |
| 2003/0018087 A1 | 1/2003 | Wittenbrink et al. |

FOREIGN PATENT DOCUMENTS

| | | |
|---|---|---|
| RU | 2156650 C1 | 12/1998 |
| WO | WO 02/31083 A2 | 4/2002 |

*Primary Examiner*—J. Parsa
(74) *Attorney, Agent, or Firm*—Burns, Doane, Swecker & Mathis, L.L.P.

(57) ABSTRACT

Novel methods of controlling the temperature of an exothermic reaction are disclosed. Such methods are particularly applicable to a Fischer-Tropsch synthesis reaction, and comprise removing a vapor phase product from the Fischer-Tropsch reactor, condensing at least a portion of the vapor phase product to form a volatilizable liquid, and injecting at least a portion of the volatilizable liquid into the reactor, wherein the volatilizable liquid comprises hydrocarbons that are in the highest boiling point range of the vapor phase product that is removed from the reactor.

13 Claims, 1 Drawing Sheet

METHODS OF CONTROLLING THE TEMPERATURE OF AN EXOTHERMIC REACTION

BACKGROUND OF THE INVENTION

1. Field of the Invention

The present invention relates in general to methods of controlling the temperature of an exothermic reaction. More specifically, embodiments of the present invention are directed toward controlling the temperature of a Fischer-Tropsch synthesis by injecting a volatilizable liquid into the reactor, the volatilizable liquid being derived from the vapor products of the reaction.

2. State of the Art

It is generally desirable to remove at least a portion of the heat of reaction from a chemical reaction that is highly exothermic, such as a hydrocarbon synthesis. Excess heat of reaction may lead to an unacceptable increase in the temperature of the reactor contents, affecting the kinetics of the hydrocarbon synthesis. Changes in reaction kinetics may in turn adversely affect the molecular weight distribution of the products; for example, increasing the production of less desirable lower molecular weight products (e.g., methane), while simultaneously decreasing the production of the more valuable higher molecular weight products (e.g., hydrocarbons having a boiling point within the jet, naphtha, wax, and lubricant oil basestock range). If the reaction temperature is not properly controlled, the heat generated may exceed that for which the reactor was designed to handle, and in extreme situations, a serious safety hazard may develop.

Prior art methods of addressing heat generation from a highly exothermic reaction, such as a Fischer-Tropsch synthesis, have included the use of long, tubular-shaped reactors that have a greater surface area to volume ratio than more conventional cylindrical reactors, thereby providing additional surface area for cooling. Another method disclosed in the prior art has been directed to carrying out the reaction at low conversion rates such that unreacted gas passing through the reactor may be used to remove heat.

Process heat can be removed from exothermic reactors with indirect heat exchangers. Commonly, reactors are designed with internal heat exchangers equipped with cooling coils that are positioned inside the reactor. The cooling coils may be configured as structures other than coils, such as tubes, shells, fins, and the like. A cooling medium is circulated within the cooling coils such that the cooling medium is not in contact with the reaction medium. It is conventional to use water as a cooling medium, in which case the water may be converted to steam as the liquid water absorbs heat from the reactor contents. Alternatively, reactors may be designed with external heat exchangers. In each of these cases, the process stream or reaction medium is kept separated from the cooling medium because the cooling medium is confined within the walls of the heat exchanger's cooling coils. When the cooling medium comprises liquid water, the temperature of the reactor may be regulated by controlling the pressure of the steam generated within the cooling coils. If higher temperatures are desired, the steam pressure within the coils may be set to a higher value. Conversely, when lower temperatures are desired, the coil steam pressure are set to a lower value.

The synthesis of hydrocarbons using a Fischer-Tropsch process is well known in the art. In the Fischer-Tropsch process, a mixture comprising substantially carbon monoxide (CO) and hydrogen ($H_2$) is reacted over a catalyst to form hydrocarbon products having a broad spectrum of molecular weights ranging from methane ($C_1$) to wax ($C_{20+}$). Fischer-Tropsch processes which employ particulate fluidized beds and slurry bubble column reactors are also well known in the art. Slurry bubble column reactors operate by suspending catalytic particles in a liquid and feeding gas phase reactants into the reactor through a gas distributor which produces small gas bubbles. As the gas bubbles rise through the reactor, the reactants are absorbed into the liquid and diffuse to the catalyst where, depending on the catalyst system, they can be converted to both liquid and gaseous products. If gaseous products are formed, they enter the gas bubbles and are collected at the top of the reactor. Liquid products are recovered by passing the slurry through a filter which separates the liquid from the catalytic solids. A principal advantage of slurry reactors over fixed bed reactors is that the pressure of the circulating, agitated slurry phase increases the rate of heat transfer to cooling devices built into the reactor. An advantage of bubble column reactors is that the required mixing is affected by the action of rising bubbles, a process significantly more efficient than mechanical stirring.

While the Fischer-Tropsch reaction is catalyst dependent to a degree (i.e., dependent on the particular type and nature of the catalyst), its reaction rate generally increases with temperature. Employing a greater number of cooling coils within the reactor decreases the distance between adjacent coils and enhances temperature uniformity, but this comes at the expense of reactor volume that otherwise would have been available for catalyst loading, and conversion of Fischer-Tropsch reactants to products. A greater number of cooling coils also lowers the space velocity of the reactants. Thus, conventional prior art designs endeavor to balance these requirements when determining the appropriate number of cooling coils to use. On the other hand, the hottest spot in the reactor limits the temperature as it contributes to undesirable methane formation. Providing a more uniform temperature distribution throughout the reactor allows for operation at a higher average temperature without excessive methane formation.

Though the use of slurry bed reactors is advantageous for controlling the temperature of an exothermic reaction, there can be disadvantages. One drawback is the difficulty of separating wax products from fine catalyst particles, and the efficient conversion of reactants to products. The gas in the reactor can become depleted in one of the reactants, either hydrogen or carbon monoxide, for example, in which case the reaction rate will slow to below commercially viable levels. Another problem associated with a Fischer-Tropsch synthesis is that as reactant gases are converted into hydrocarbons and water, diluent gases in the feed stream gas, such as water vapor, light hydrocarbons, and contaminants, may dilute the hydrogen gas and the carbon monoxide gas to the point where the reaction rate of the exothermic reaction is significantly reduced.

Additionally, high temperatures often lead to carbon deposition on the catalyst and catalyst particle fragmentation. Carbon deposition and catalyst particle fragmentation is undesirable because the catalyst life is shortened.

Finally, since reactants in a Fischer-Tropsch reactor are typically gasses, the lack of uniform gas distribution within the reactor can affect reactor performance. Poor gas distribution can result in slug flow in slurry reactors or channeling in tubular reactors such that the reactor gases are not uniformly exposed to the catalyst. Gas maldistribution may result in a hot spot in the reactor which favors the undesired production of low molecular weight hydrocarbons, such as methane, as well as damage to the catalyst. The prior art teaches that such maldistribution and backmixing commonly occurs in conventional Fischer-Tropsch processes.

Thus, there is a need in the art for improved methods of heat removal from exothermic process reactors, including Fischer-Tropsch reactors, such that the desired yields of higher molecular weight hydrocarbons are produced. It is further desirable to have exothermic processes with sufficient temperature control such that catalyst deactivation through carbon deposition, and catalyst fragmentation is substantially avoided.

SUMMARY OF THE INVENTION

Embodiments of the present invention include methods of controlling the temperature of an exothermic reaction by:

a) contacting within a reactor a gaseous reactant with a catalyst to form reaction products, the reaction products existing in both a liquid and vapor phase;

b) removing at least a portion of the vapor phase reaction products from the reactor;

c) condensing at least a portion of the removed vapor phase reaction products at a location outside the reactor to form a volatilizable liquid; and d) injecting at least a portion of the volatilizable liquid into the liquid phase reaction products contained within the reactor;

wherein the volatilizable liquid comprises at least 10 percent by weight $C_{11+}$ hydrocarbons.

In a particular embodiment, the volatilizable liquid comprises at least 10 percent by weight $C_{11}$ to $C_{20}$ hydrocarbons. In another embodiment, the volatilizable liquid comprises at least 10 percent by weight $C_{11}$ to $C_{15}$ hydrocarbons.

According to other embodiments, the exothermic reaction may be a Fischer-Tropsch synthesis, which, according to further embodiments, may be carried out in a slurry-type reactor. The present methods include the step of condensing at least a portion of the volatilizable liquid outside the reactor to remove from the reactor at least a portion of the heat generated by the exothermic reaction.

There are advantages in selecting hydrocarbons in the highest boiling point range of the materials exiting the reactor in the vapor phase for use (along with lower boiling hydrocarbons) as the volatilizable liquid. The higher boiling hydrocarbons include, in particular, $C_{11+}$ hydrocarbons. Under suitable operating conditions, this higher boiling material boils at a temperature that is substantially near the reaction temperature, and as a consequence, its removal from the reactor provides an effective method by which the temperature of the contents of reactor may be controlled. Since the boiling point of the higher boiling material is close to the reaction temperature, it is more effective in maintaining control of the reactor temperature at the desired set point than lighter components (which would continue to boil at undesirably low reaction temperatures).

In addition, the injection of the high boiling portion has the advantage of exerting a relatively small influence on the vapor pressure of the synthesis gas inside the reactor because the high boiling fraction contains the highest molecular weight materials of all the species in the vapor phase.

An additional benefit of adding the volatilizable liquid is that it will have a lower molecular weight than the slurry as a whole. This will in turn reduce the viscosity of the slurry. Reducing the viscosity improves both the mass and heat transfer, and an improved mass transfer will facilitate the conversion. Improved heat transfer at the catalyst surface will reduce the overheating of the catalyst by the exothermic reaction, which is desirable because a reduction in overheating will reduce methane yield. At cooling tube surfaces (if any cooling tubes are present within the reactor), lowering the viscosity of the slurry will also improve heat transfer. A higher boiling volatilizable liquid will be more effective than a lighter (lower boiling) one because a greater portion of the liquid will remain in the liquid phase for a longer period of time. Thus, a higher boiling volatilizable liquid will vaporize more slowly than the lower boiling one.

DETAILED DESCRIPTION OF THE INVENTION

Figure 1:
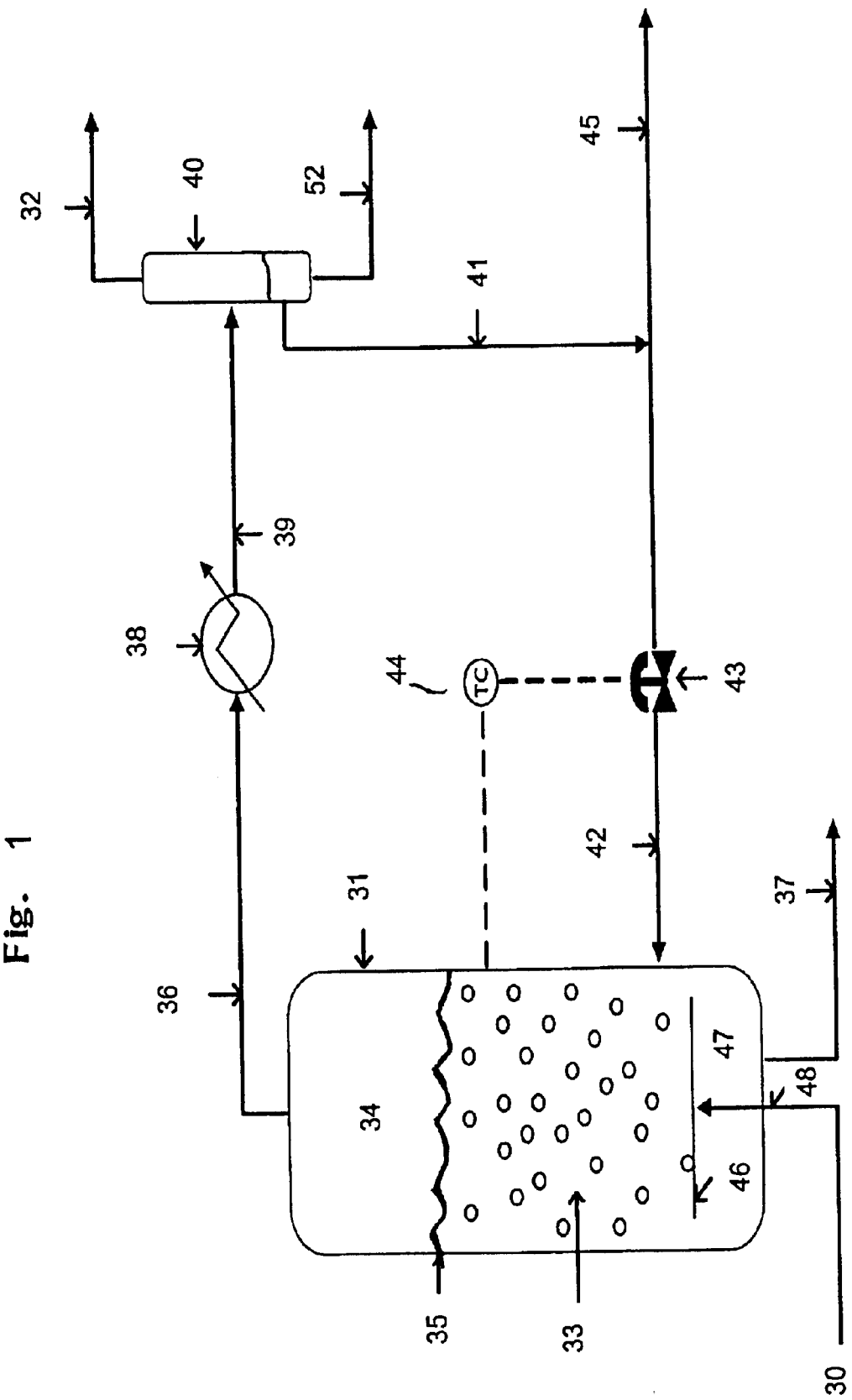
FIG. 1 illustrates an embodiment of the present invention wherein at least a portion of the vapor phase products are removed from a Fischer-Tropsch synthesis process; at least a portion of the vapor phase products are then condensed to form a volatilizable liquid; the volatilizable liquid is then injected into the Fischer-Tropsch reactor.

The majority of the fuel used today is derived from crude oil, and crude oil is in limited supply. However, there is an alternative feedstock from which hydrocarbon fuels, lubricating oils, chemicals, and chemical feedstocks may be produced; this feedstock is natural gas. One method of utilizing natural gas to produce fuels and the like involves first converting the natural gas into an "intermediate" known as syngas (also known as synthesis gas), a mixture of carbon monoxide (CO) and hydrogen ($H_2$), and then converting that syngas into the desired liquid fuels using a process known as a Fischer-Tropsch (FT) synthesis. A Fischer-Tropsch synthesis is an example of a so-called gas-to-liquids (GTL) process since natural gas is converted into a liquid fuel. Typically, Fischer-Tropsch syntheses are carried out in slurry bed or fluid bed reactors, and the hydrocarbon products have a broad spectrum of molecular weights ranging from methane ($C_1$) to wax ($C_{20+}$).

The main technical problems confronting exothermic reactions in general, and a Fischer-Tropsch synthesis in particular, include the requirements for: (1) removing the heat of reaction; (2) avoiding local overheating of the catalysts; and (3) obtaining a uniform distribution of the synthesis gas over the catalyst. High temperatures and local catalyst overheating can cause excessive methane generation, carbon deposition on the catalyst and/or the internal cooling equipment, as well as catalyst particle fragmentation. Methane generation is generally not desired because the yield of higher hydrocarbons is reduced relative to what it otherwise would have been. Additionally, carbon deposition can coat and deactivate the catalyst, shift the selectivity toward lower molecular weight hydrocarbons, and reduce the heat transfer efficiency of the cooling units. Thus, a major concern in synthesis reactor design is heat transfer.

Because the Fischer-Tropsch reaction occurs at catalyst sites, the temperature profile may not be uniform throughout the reactor. The temperature profile depends on reactor design/configuration, reaction kinetics, and processing conditions. Since the temperature of a typical reaction mixture is regulated by the amount of heat absorbed by cooling coils, the reaction medium adjacent to the external surfaces of the cooling coils may exhibit the lowest temperatures within the reactor. In contrast, the reaction medium in spaces that are far away from the cooling coils may be at higher temperatures. As a consequence, the synthesis gas which reacts at locations furthest from the cooling coils (that is, at the hottest zones of the reactor), will tend to produce less valuable products.

Embodiments of the present invention are directed to methods of controlling the temperature of an exothermic reaction. The present inventors have discovered methods of removing at least a portion of the heat generated by an exothermic reaction without resorting to the use of cooling coils, whether those cooling coils are positioned externally to, or internally within, the reactor in which the exothermic reaction is being carried out. The inventive methods are particularly well-suited for an exothermic reaction such as a Fischer-Tropsch synthesis. Advantages of the present methods include better temperature uniformity within the reactor, which leads to longer catalyst life, and less potential for damage to reactor internals. Additional advantages include enhanced production of the more desirable higher molecular weight products of the synthesis.

Though not wishing to be bound by any particular theory, the inventors have observed that at least some of the heat generated by an exothermic reaction (such as a Fischer-Tropsch synthesis) may be disposed of by removing at least a portion of the vapor-phase products of the reaction from the reactor, condensing at least a portion of those products into a liquid at a location outside the reactor, and recycling at least a portion of the condensed material back into the reactor, whereupon at least some of the recycled material may be vaporized such that these products are once again in the vapor state.

The material that is recycled to the reactor may be termed a "volatilizable liquid." The term stems from the fact that the recycled liquid has been formed by a condensation of vapor phase products ("the condensate"), and since the material was once in the vapor phase, at least some of it is capable of being put into the vapor phase again at reaction temperatures. As will be appreciated by those skilled in the art, the energy required to vaporize a given amount of liquid is substantially the same as that released when the same material condenses back to a liquid. Since the vaporization event occurs within the reactor, and the corresponding condensation event occurs outside the reactor, that amount of energy (and/or heat) has been removed from the reactor.

Temperature control has been discussed in U.S. Pat. No. 6,160,026 to Dai et al., in which the use of internal heat exchangers is taught. Another method of heat removal taught by Dai et al. is the removal of a stream of liquid medium and product for cooling, and returning either cooled liquid medium or adding liquid medium from another source to the reactor.

A method of temperature control in a Fischer-Tropsch synthesis process is discussed in International Publication WO 02/31083, in which it is taught that at least a portion of the heat of reaction can be removed from a slurry reactor by vaporising a low boiling solvent in the slurry reactor, withdrawing a gaseous stream comprising unconverted synthesis gas and vaporised low boiling solvent from the reactor, cooling the gaseous stream to a temperature sufficient to form a two phase mixture of gas and condensed liquid, and recycling the condensed liquid and gas to the reactor. Evaporation of the low boiling solvent in the slurry reactor and cooling of the gaseous recycle stream results in the removal of at least a portion of the heat of reaction.

However, WO 02/31083 teaches that the low boiling solvent is selected from the group consisting of aliphatic hydrocarbons having from 5 to 10 carbon atoms, and alcohols having from 1 to 4 carbon atoms, particularly methanol. In particular, hydrocarbon products having from 5 to 10 carbon atoms such as pentanes, hexanes, and hexenes are taught. In contrast, the present applicants have found that a volatilizable liquid comprising hydrocarbons in the highest boiling point range of the material exiting the reactor as the vapor phase product stream has advantages not taught by the prior art.

The Fischer-Tropsch Synthesis

A variety of reactors may be used to carry out highly exothermic processes in accordance with the principles of the present invention. These reactor types include, but are not limited to, fixed bed reactors containing one or more catalyst beds, fluidized bed reactors, slurry reactors, and systems having a combination of different reactor types. Fixed bed reactors, which are generally heat transfer limited, tend to produce a lower volume of liquid product because of less efficient cooling relative to other reactor designs. Consequently, reactors having fixed beds are conventionally operated at a lower throughput rate in order to maintain adequate temperature control.

There are two basic types of Fischer-Tropsch reactors in use: 1) those in which the product of the reaction exits the reactor entirely as a gas, and 2) those in which the product of the reaction exits the reactor in both liquid and gas phases. Slurry bed and slurry bubble column reactors fall into the latter category. Although Fischer-Tropsch reactions may be carried out in a fixed bed reactor, slurry bed and fluidized bed reactors are generally preferred.

The Fischer-Tropsch reaction is typically conducted at a temperature ranging from about 300 to 700° F. (149 to 371° C.), where a preferable temperature range is from about 400 to 550° F. (204 to 288° C.). The actual reaction temperature is largely determined by the reactor size and dimensions. For a fluidized bed reactor, the reaction temperature is preferably between about 300° C. and 340° C.; for a fixed bed reactor the reaction temperature is preferably between about 200° C. and 250° C.; and for a slurry bed reactor, the reaction temperature is preferably between about 190° C. and 270° C. The reactor columns are generally operated at an elevated pressure of from about 10 to 600 psia (0.7 to 41 bars), and preferably between about 30 and 300 psia (2 to 21 bars). Typical catalyst space velocities range from about 100 to 10,000 cc/g/hr, where a preferable space velocity ranges from about 300 to 3,000 cc/g/hr. In the slurry bed reactor, the catalyst space velocity generally ranges from about 1 to 20 $m^3$ /(kg catalyst)/hour and preferably from 8 to 12 $m^3$ /(kg catalyst)/ hour. It will be apparent to those skilled in the art that the specific operating conditions of any one particular reactor will largely depend on the reactor type being used and on the products that are desired.

The rate of conversion of carbon monoxide to high molecular weight hydrocarbons, and the selectivity of the reaction to yield desired reaction products, depend on the partial pressure of the reactants, i.e., hydrogen and carbon monoxide, and, in some cases, on the partial pressure of the products as well. In a preferred embodiment, the inlet pressure of syngas to the Fischer-Tropsch reactor ranges from about 1 to 50 bar, and more preferably from about 15 to 50 bar. The synthesis gas typically has a $H_2$:CO molar ratio, in the fresh feed, of about 1.5:1 to 2.5:1, and more preferably of about 1.8:1 to 2.2: 1. A gas recycle may optionally be coupled to the reaction stage, and the ratio of the gas recycle rate to the fresh synthesis gas feed rate, on a molar basis, ranges from about 1:1 to 3:1, and preferably from about 1.5:1 to 2.5:1.

The Volatilizable Liquid

The present embodiments contemplated for use with a Fischer-Tropsch reactor are shown schematically in FIG. 1.

Referring to FIG. 1, a synthesis gas 30 is injected into a Fischer Tropsch reactor 31, which is equipped with an inlet distributor 46 for distributing reactants within the reactor. The reactor 31 is appropriately charged with catalyst(s). As the exothermic reaction proceeds, the reactants flow in a generally upwards direction through slurry phase 33, and react over the catalyst to form additional hydrocarbons, some of which become part of the slurry phase 33. A vapor phase 34 is formed above a slurry-vapor interface level 35, and vapor and liquid products are removed from the reactor as streams 36 and 37, respectively.

At least a portion of the vapor product 36 is condensed in the partial condenser 38, and then fed through a line 39 into reservoir 40. The partial condenser 38 also functions as a gas/liquid separator. Vapor product which is depleted by at least about 25 percent by weight of the highest boiling materials becomes a stream 41, some or all of which is available to be injected into the Fischer-Tropsch reactor 31 as volatilizable liquid stream 42. A control valve 43 may be used to regulate the flow of the volatilizable liquid stream 42 into the reactor 31, and by controlling the flow of the volatilizable liquid stream 42 in such a manner (using temperature measurements from the thermocouple 44, if desired), the temperature of the reactor 31 may be maintained at a desired level. Excess volatilizable liquid that is not needed to control the temperature of the exothermic reaction may be removed from stream 41 as a product stream 45.

In one embodiment, material in the highest boiling point range of materials in the vapor phase 36 exiting the reactor is selected for use as the volatilizable liquid 42. Under suitable operating conditions, this material boils at a temperature that is substantially near the reaction temperature, and as a consequence, its removal provides an effective method by which the temperature of the contents of reactor 31 may be controlled. In contrast, lower boiling range materials vaporize too quickly within the reactor, reducing the vapor pressure of the gaseous reactants and potentially cooling the reactor below the desired reactor temperature.

The volatilizable liquid 42 may be used to control the temperature of the reaction in the following manner. If reaction temperatures are desired that are higher than those set initially, then the recycle rate of the volatilizable liquid 42 may be reduced. As the reactor temperature rises, the boiling range of the highest boiling material exiting the reactor in the vapor phase 36 also increases, thereby providing a stream that is tailored to control the reaction temperature at the higher set level. Alternatively, a mixture of the highest boiling materials in the vapor phase 36 may be condensed and recycled to the reactor 31. While this increases the complexity of the reaction kinetics, such mixtures may be utilized to alter the selectivity of the reaction products.

In an alternative embodiment, the vapor phase product stream 36 may be condensed to yield both a hydrocarbon phase and a liquid water phase (not shown as separate phases in FIG. 1). The hydrocarbon phase may then be separated from the water phase by conventional methods, such as by density separation, wherein the separation step is performed before the hydrocarbon phase is recycled to the reactor 31 as the volatilizable liquid stream 42.

In some embodiments, the volatilizable liquid may initially dilute the synthesis gas (and thus reduce the rate of reaction) when first injected into the reactor 31. This anticipated rate reduction may be off-set, and in some cases substantially avoided, by adjusting appropriate reactor parameters such as temperature, pressure, gas flow rate, gas composition, slurry level, catalyst amount, catalyst composition, and combinations thereof. While the volatilizable liquid 42 may be injected at any location along the reaction zone of the reactor 31, the preferred location for injection for a slurry bed type of Fischer-Tropsch reactor is above the synthesis gas inlet distributor 46, and below the slurry-vapor interface level 35. In one embodiment, the point of injection is located immediately above the synthesis gas inlet distributor 46. The phrase "immediately above the distributor" means within a distance of about 0 and 50%, preferably within a distance of about 0 and 25%, and most preferably within a distance of about 0 and 10% of the distance from the gas inlet distributor 46 to the slurry-vapor interface 35. Locating the injection point near the gas inlet distributor 46 increases the mixing of the volatilizable liquid 42 with the contents of reactor 31. However, it is also possible to mix the volatilizable liquid 42 with the synthesis gas 30 in a region 47 between the gas inlet distributor 46 and a nozzle through which the synthesis gas is introduced to the reactor 31, provided that the nozzle 48 is designed to handle a mixture of both liquid and gas. An example of a design parameter pertaining to nozzle 48 that affects its ability to handle both liquids and gases is the diameter of the nozzle.

Regardless of whether heat removal from the reactor is accomplished with conventional steam coils, the inventive volatilizable liquid, or a combination of both, the total amount of heat that is removed from a Fischer-Tropsch reactor is substantially the same. However, it will be appreciated by those skilled in the art that with the inventive methods disclosed herein, at least a portion of the heat removal from the synthesis reaction occurs at a location outside the reactor; specifically, within the partial condenser 38. Thus, the capital expenditure for the inventive process using a volatilizable liquid is substantially less than that for comparable systems that use steam coils. In addition, as indicated previously, the removal of some or all of the steam coils from the reactor chamber frees up a volume within the reactor for additional reaction to take place, and thus greater reaction yields may be realized.

The products from Fischer-Tropsch reactions performed in slurry bed reactors generally include a light product and a waxy (heavy) product. The light product 36 is separated in separator 40 into a condensate fraction 41 generally boiling below about 700° F. and usually in the range $C_5$ to 700° F., a tail gas 32, which generally boils in the $C_{5-}$range, and an aqueous fraction 52. Separator 40 is at least one separation unit, such as a flash separator, although a combination of separators, including a distillation column, may be employed for the separation represented by separator 40. In the present process, the removal of water from the condensate fraction prior to reintroducing at least a portion of the condensate to the reaction vessel 31 is considered optional (and in some embodiments, may be preferred). The waxy product 37 (i.e. the wax fraction) includes hydrocarbons boiling above about 600° F. (e.g., vacuum gas oil through heavy paraffins), largely in the $C_{20+}$range, with decreasing amounts down to $C_{10}$. The hydrocarbon portion of both the light product 36 and the waxy product 37 are substantially paraffinic. The waxy product generally comprises greater than about 70 wt % normal paraffins, and often greater than about 80 wt % normal paraffins. The hydrocarbon portion of the light product comprises paraffinic products with a significant proportion of alcohols and olefins. In some cases, the hydrocarbon portion of the light product may comprise as much as 50 wt %, and even higher, of the compounds alcohols and olefins.

The Fischer-Tropsch synthesis conditions can be adjusted to yield products having boiling points at reaction conditions that are about the same as the desired reactor temperature. A desired volatilizable liquid is produced when paraffins and other hydrocarbons having boiling points below the desired product paraffin boiling point range are removed from the gaseous reaction products. If the desired boiling point paraffin is in the liquid phase, such liquid may be recycled and removed permanently as product in a subsequent pass. Alternatively, the desired paraffin can be taken off as a vapor product in a single pass through the reactor.

In the case of a slurry bed reactor, the product vapor stream can be separated into a tail gas fraction 32, i.e., $C_1$ to about $C_4$, and another fraction that ranges from about $C_5$ up to a selected higher value, using a high/low pressure and/or lower temperature vapor liquid separator, or a combination of separators. The tail gas 32 of the Fisher-Tropsch reaction contains hydrogen, carbon monoxide, carbon dioxide and some light hydrocarbons gases ranging from methane to butane. The excess hydrogen, and other tail gas components, can be stripped out of the tail gas through a membrane system or other such separation device, and recycled to the reactor for further processing. Additionally, carbon dioxide generated in the unit can also be separated from the tail gas fraction and recycled or removed.

The condensate fraction 41 can be used in its entirety as the volatilizable liquid, in which case it will contain a mixture of boiling points, or it can be further fractionated and a certain component thereof selected for use as the volatilizable liquid. In either instance, the desired products may include gasoline and light middle distillates, the latter of which may be further refined. Thus the bubble reactor slurry will contain liquid hydrocarbonaceous components boiling above the selected operating temperature, which in turn is determined by the boiling point of the volatilizable liquid.

According to an embodiment of the present invention, the volatilizable liquid comprises at least 10 percent by weight hydrocarbons having 11 or more carbon atoms (i.e. $C_{11+}$). In a particular embodiment, the volatilizable liquid comprises at least 10 percent by weight hydrocarbons having from 11 to 20 carbon atoms (i.e. $C_{11}$ to $C_{20}$). In another embodiment, the volatilizable liquid comprises at least 10 percent by weight hydrocarbons having from 11 to 15 carbon atoms (i.e. $C_{11}$ to $C_{15}$). The volatilizable liquid may also comprise hydrocarbons selected from the group consisting of paraffins and 1-olefins. The ratio of the hydrocarbon content of the volatilizable liquid that is in the $C_1$ to $C_{10}$ range to the $C_{11+}$ range may vary. In one embodiment, the volatilizable liquid comprises less than about 50 percent by weight $C_1$ to $C_{10}$ hydrocarbons; in another, the volatilizable liquid comprises at least 10 percent by weight $C_{11+}$ hydrocarbons. Of course, the $C_{11+}$ hydrocarbons (as well as the preferred $C_{11}$ to $C_{20}$ and the more preferred $C_{11}$ to $C_{15}$ ranges) may be increased to at least 20 percent by weight, and at least 30 percent by weight, in an alternative embodiments. The volatilizable liquid may also contain some of the heaviest hydrocarbons of the vapor product stream, and in one embodiment may contain at least 5 percent by weight $C_{16+}$ hydrocarbons.

The liquid product 37 of the synthesis reaction, after removal of the catalyst, is typically separated-into a wax fraction containing primarily $C_{10}$ to $C_{50}$ linear paraffins, but potentially including some higher branched paraffins as well. A narrower fraction of paraffins in the liquid phase can be generated with the use of recycle stream and/or a cooled recycled stream to the reactor. It is contemplated that the embodiments of the present invention may be coupled with a recycled slurry bed with the addition of external cooling to the recycled slurry.

In another embodiment, water is used as the volatilizable liquid. A primary source of the water is, again, a product of the Fischer-Tropsch reaction. Conventional Fischer-Tropsch reactions catalyzed by iron generate about 0.7 barrels of water for each barrel of products, whereas those processes that employ a cobalt catalyst can generate about 1.1 to 1.3 barrels of water for each barrel of product.

It is generally preferable to use a non-shifting Fischer-Tropsch catalyst when the volatilizable liquid is predominantly water or an aqueous-based liquid. This is so that the following water gas shift reaction:

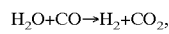
$$H_2O+CO \rightarrow H_2+CO_2,$$

is not driven appreciably to the right, in favor of the production of $CO_2$. Moreover, the water gas shift reaction increases the ratio of $H_2$ to CO, which may cause an increase in the formation of unwanted light products. Thus, carbon dioxide not only acts as a diluent, but its presence leads to undesired reactions. Exemplary non-shifting Fischer-Tropsch catalysts are based on cobalt, while exemplary shifting Fischer-Tropsch catalysts include those that contain iron.

In some embodiments it may be necessary to use a non-shifting catalyst, and if this is the case, it is still preferable to inject a hydrocarbon-based volatilizable liquid (instead of an aqueous-based volatilizable liquid) into the reactor. This is because the molecular weight of a typical hydrocarbon of interest is greater than that of water, and so there will be fewer moles of hydrocarbons, and therefore a lower partial pressure, than there would have been for water in the volatilized liquid portion of the gas phase. Volatilized liquid in the gas phase lowers the partial pressure for the syngas, which in turn reduces the reaction rate. Thus, in a preferred embodiment, it is desirable to use volatilizable liquids with as high of a molecular weight as possible provided that at least 30 wt % of the liquid volatizes under reaction conditions. Since water is a product of the Fischer-Tropsch reaction, water acts to inhibit the rate of reaction. The pressure of water has an inhibitory effect beyond what would be expected from a reduction in the partial pressure of the syngas.

The vapor product stream 36 from a Fischer-Tropsch reactor may contain both hydrocarbons and water in the form of steam. The boiling point range of the hydrocarbons is generally both above and below that of water. While a mixed phase stream of both water and hydrocarbons can be used as a volatilizable liquid, it is preferred that only a substantially hydrocarbon-containing volatilizable liquid is injected into the reactor. Of the hydrocarbons that comprise the volatilizable liquid, the highest boiling hydrocarbons from the vapor product are preferred. To obtain the preferred stream with the highest boiling hydrocarbons and substantially no separate water phase, the vapor product from the Fischer-Tropsch reactor can be cooled to a temperature that is sufficiently low to condense the highest boiling hydrocarbons, but not low enough to develop a separate liquid water phase.

EXAMPLE

Exemplary Volatilizable Liquid for Use in a Fischer-Tropsch Synthesis Reaction

The following table describes the components of an exemplary volatilizable liquid which may be used to remove heat from a reactor carrying out a Fischer-Tropsch synthesis reaction. The example is given for the purpose of illustrating embodiments of the present invention, and should not be construed as being limitations on the scope or spirit of the instant invention.

The table gives a distribution of hydrocarbons comprising the vapor phase product stream from a Fischer-Tropsch synthesis, wherein the distribution is quantified by number of carbon atoms in the hydrocarbon molecules comprising the product stream. The hydrocarbons in the product stream are categorized into four groups by carbon number, the four groups being: $C_{1-4}$, $C_{5-10}$, $C_{11-15}$, and $C_{16+}$. The amount of each of each group present in the product stream is given as percent by weight of the total product stream, and this calculation has been repeated for the start, middle, and end of an exemplary synthesis.

The data shows that about 48 percent by weight of the vapor product stream is made up of hydrocarbons having from about 5 to 10 carbon atoms; about 36 percent by weight comprises hydrocarbons having from 11 to 15 carbon atoms; and that about 9 to 10 percent by weight of the vapor product stream comprises hydrocarbons having over 16 carbon atoms.

The volatilizable liquid contemplated by this example comprises hydrocarbons from either of the $C_{11-15}$ group, or the $C_{16+}$, or both. The volatilizable liquid may also include hydrocarbons from the $C_{5-10}$ group.

| Carbon number | Start of Run (percent by weight) | Middle of Run (percent by weight) | End of Run (percent by weight) |
|---|---|---|---|
| $C_{1-4}$ | 1.566 | 1.575 | 1.568 |
| $C_{5-10}$ | 48.423 | 48.366 | 48.214 |
| $C_{11-15}$ | 36.087 | 36.024 | 36.055 |
| $C_{16+}$ | 9.485 | 9.670 | 9.825 |

All of the publications, patents and patent applications cited in this application are herein incorporated by reference in their entirety to the same extent as if the disclosure of each individual publication, patent application or patent was specifically and individually indicated to be incorporated by reference in its entirety.

Many modifications of the exemplary embodiments of the invention disclosed above will readily occur to those skilled in the art. Accordingly, the invention is to be constructed as including all structure and methods that fall within the scope of the appended claims.

What is claimed is:

1. A method of controlling the temperature of an exothermic reaction, the method comprising:
  a) contacting within a reactor a gaseous reactant with a catalyst to form reaction products, the reaction products existing in both a liquid and vapor phase;
  b) removing at least a portion of the vapor phase reaction products from the reactor;
  c) condensing at least a portion of the removed vapor phase reaction products at a location outside the reactor to form a volatilizable liquid; and
  d) injecting at least a portion of the volatilizable liquid into the liquid phase reaction products contained within the reactor;

wherein the volatilizable liquid comprises at least 10 percent by weight $C_{11+}$ hydrocarbons and has a boiling point substantially the same as the reaction temperature.

2. The method of claim 1, wherein the volatilizable liquid comprises at least 10 percent by weight $C_{11}$ to $C_{20}$ hydrocarbons.

3. The method of claim 1, wherein the volatilizable liquid comprises at least 10 percent by weight $C_{11}$ to $C_{15}$ hydrocarbons.

4. The method of claim 3, wherein the volatilizable liquid comprises at least 20 percent by weight $C_{11}$ to $C_{15}$ hydrocarbons.

5. The method of claim 3, wherein the volatilizable liquid comprises at least 30 percent by weight $C_{11}$ to $C_{15}$ hydrocarbons.

6. The method of claim 1, wherein the volatilizable liquid comprises at least 5 percent by weight $C_{16+}$ hydrocarbons.

7. The method of claim 1, wherein the exothermic reaction is a Fischer-Tropsch synthesis.

8. The method of claim 7, wherein the Fischer-Tropsch synthesis is carried out in a slurry-type reactor.

9. The method of claim 7, wherein the volatilizable liquid is a product from the Fischer-Tropsch synthesis.

10. The method of claim 9, wherein the volatilizable liquid is a condensate fraction boiling in the range $C_5$ to 700° F.

11. The method of claim 1, wherein the volatilizable liquid comprises hydrocarbons selected form the group consisting of paraffins and 1-olefins.

12. The method of claim 1, wherein the volatilizable liquid comprises less than about 50 percent by weight $C_1$ to $C_{10}$ hydrocarbons.

13. A method of controlling the temperature of an exothermic reaction, the method comprising:
  a) contacting within a reactor a gaseous reactant with a catalyst to form reaction products, the reaction products existing in both a liquid and vapor phase;
  b) removing at least a portion of the vapor phase reaction products from the reactor;
  c) condensing at least a portion of the removed vapor phase reaction products at a location outside the reactor to form a volatilizable liquid; and
  d) injecting at least a portion of the volatilizable liquid into the liquid phase reaction products contained within the reactor;

wherein the volatilizable liquid comprises at least 10 percent by weight $C_{11+}$ hydrocarbons and has a boiling point such that at least 30 wt % of the volatilizable liquid boils under reaction conditions.

* * * * *